UNITED STATES PATENT OFFICE.

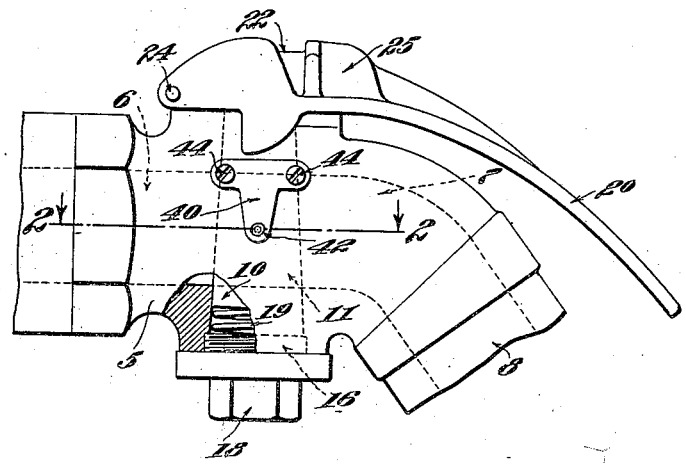

ALBERT L. COLE, OF AUBURNDALE, MASSACHUSETTS, ASSIGNOR OF ONE-FOURTH TO FRANCIS J. V. DAKIN, OF NEWTONVILLE, MASSACHUSETTS, AND ONE-FOURTH TO FRANK A. TILTON, OF SOUTH BRAINTREE, MASSACHUSETTS.

SHUT-OFF VALVE FOR AIR-BRAKE PIPES.

1,424,083.   Specification of Letters Patent.   Patented July 25, 1922.

Application filed July 6, 1920. Serial No. 394,106.

*To all whom it may concern:*

Be it known that I, ALBERT L. COLE, a citizen of the United States, residing at Auburndale, in the county of Middlesex and State of Massachusetts, have invented a new and useful Improvement in Shut-Off Valves for Air-Brake Pipes, of which the following is a specification, reference being had therein to the accompanying drawings.

This invention relates to shut-off valve for air-brake pipes on railroad cars.

In the use of air-brakes on railroad cars a main air-pipe extends the length of each car, having on each end a flexible hose of rubber or other suitable material carrying a coupling member on its free end so that in making up cars in trains, the main air-pipes in the cars may be connected in series by coupling together the flexible hose of the contiguous car ends. In order to prevent the compressed air escaping from the air-pipe main at the rear of the train or when cars are uncoupled, each car is provided with two shut-off valves in the air-pipe, one at each end of the car. When cars are to be uncoupled, a trainman steps between the two cars and closes the two shut-off valves at the two adjacent ends of the cars and then uncouples the two connected flexible hose carrying the coupling members. This latter operation requires the exercise of considerable effort on the part of the trainman because the coupled ends of the flexible hose must be lifted up and the two coupling members turned in opposite directions for releasing. Each coupling is provided with a rubber or fibre gasket adapted to engage a similar gasket in the other coupling when the two are coupled, and these gaskets are so arranged in the couplings that the air pressure in the hose forces the two gaskets together to form a tight joint. The closing of the two shut-off valves does not affect the high air pressure in the two hose ends and consequently considerable force is required to turn the two coupling members and their gaskets upon each other in order to uncouple. In fact so difficult is it to uncouple cars under these circumstances, and these difficulties are greatly enhanced in cold weather, that trainmen have adopted the simple expedient of closing the shut-off valves and then pulling the cars apart by means of the motive agent; that is, locomotive or electric motor, as the case may be. As the cars separate, the hose connections straighten out and the coupling members automatically separate. While this is a labor saving expedient for the trainman, it is disastrous for the hose connections because they are weakened and frequently broken by the strain, and the gaskets deteriorate rapidly and leak. Furthermore, when the hose connections separate the released air pressure therein causes them to be thrown violently to one side or the other, rendering the trainman within striking distance liable to injury, by being hit by the heavy coupling member on the end of the hose. This method of uncoupling cars, which is universally employed, undoubtedly involves a very large annual outlay on the part of the railroads of the country for repairs and contributes to a lack of efficiency in the air-brake service.

Heretofore, in order to obviate the foregoing serious disadvantages, it has been contemplated to provide the shut-off valve with a suitable port in both the valve casing and the valve wall, these ports, together with the valve port, giving a clear and unobstructed passage from the interior of the hose connection to the atmosphere when the shut-off valve is in a closed position. Owing to the facts that these shut-off valves are located at the ends of the cars, where they are exposed to a great amount of dust, dirt and cinders raised by the passage of the train, and are exposed to rain, snow and ice, and that the open port in the valve casing permits of the entrance of dirt and cinders into the valve and possible injury to the valve from the same, or from the accumulation of water or ice therein, railroads have refused to use such means, consequently, the disadvantages above set forth still exist.

The main object of my invention is to provide a shut-off valve having means for bleeding the hose connections when the valve is in a closed position and with means for closing the port in the valve casing against the entrance of dirt, cinders, water and other foreign matter.

A further object of the invention is to provide a closure for said port which is simple and efficient, which is automatic in its operation and does not interfere with the operation of the valve.

Another object of the invention is to provide a closure so constructed that it may be easily and expeditiously applied to a shut-off valve and which when applied is unobtrusive and not subject to injury or dislocation when in use.

Other objects of the invention will be more specifically pointed out and described hereinafter.

In the drawings showing one form of my invention, Figure 1 is a side elevation of a shut-off valve of the form now in common use on railroad cars, showing the valve in open position and provided with means for bleeding the hose connection and a closure for the port in the valve casing; Fig. 2 is a central, horizontal, cross-sectional view on line 2—2 in Fig. 1, showing the valve in open position; Fig. 3 is a view similar to Fig. 2 showing the valve in a closed position; and Fig. 4 emphasizes a plan view and a central, longitudinal, sectional view of a closure for a port in the valve casing, both views being on an enlarged scale.

Referring to the drawings 5 designates a valve casing having a longitudinal passage 6, 7 the air-pipe main connected to said passage 6 on one side of the casing and 8 a flexible hose connection mounted on the other side of the casing. The hose connection 8 carries on its free end a coupling member of well known construction (not shown) adapted to be coupled to another coupling member of like construction for connecting the air-pipe mains in two cars. The valve casing 5 is provided with a transverse valve chamber in the form of a truncated cone, within which is fitted a spigot valve 10 also in the form of a truncated cone. The valve 10 has a through and through passage or port 11 which allows the air pressure to flow from the air-pipe main to the hose connection or vice versa when the valve is in an open position, as shown in Fig. 2. The valve 10 is held in tight engagement with the wall of the transverse chamber in the casing by any suitable means, such as a screw-cap 16 having a hexagonal head 18 and an inner helical spring 19. The spring is of sufficient stiffness to keep the valve in such tight contact with the walls of the valve chamber that the air cannot leak out.

For turning the valve either into open or closed position, a handle 20 is provided. The top of the valve is squared and over this is fitted a small frame 22 having a central square recess to receive the top of the brake. The frame is fastened to the top of the valve by a pin or other suitable means, and to the rear of the frame at 24 the handle 20 is hinged. The frame 22 is provided with a vertical tongue shown at 22 which projects loosely into a vertical slot or recess formed in a boss 25 on the handle 20 so that the turning of the handle turns the valve through the medium of the tongue on the frame.

In Figures 1 and 2 the valve is shown in an open position, but it may be closed by turning the handle through a quadrant of a circle in the direction indicated by the arrow of rotation in Fig. 2.

All of the foregoing is old and well known construction in common use at the present time.

My invention consists in forming a port 30 through one side of the casing in register with the valve port 11 when the valve is in a closed position, and a second port 32 through one side of the valve from the port 11 in register with the passage 6 on the hose connection side of the valve casing 5. When the valve is in a closed position, as shown in Fig. 3, there is a free and unobstructed passage from the hose connections through the port 32, port 11, port 30 to the atmosphere, which permits the air under pressure in the hose connections to expand into the atmosphere. When the valve is turned into an open position, as in Fig. 2, the port 30 is closed by one side wall of the valve and the port 32 by the casing, so that no air can escape through either.

In order to close the port 30 through the valve casing in order to prevent dirt, dust and other foreign matter working its way into the valve through said port, I provide a closure member 40 substantially T-shaped in form, having a boss 42 formed in the end thereof, which boss is adapted to engage the flared outer end of said port. Said closure is preferably made of a spring metal which will neither rust nor corrode, and is secured to the side of the valve casing by two screws 44, 44. If the side of the casing to which the closure is secured is round at all, it may be smoothed off flat so that the closure will hug the casing tightly to prevent the entrance of water or moisture between it and the casing. By securing the closure to the casing at two points, it is prevented from twisting laterally or becoming displaced. Constructing the closure of spring metal permits the air pressure from the hose connections, when the valve is turned into the position shown in Fig. 3 to force the boss 42 out of engagement with the flared opening of the port 30 and thereby escape into the atmosphere, the boss returning to its normal position as soon as the air pressure has been reduced to atmospheric pressure. It will be observed that the boss 42 is centrally disposed in the lower end of the closure 40 in such manner that the flat margin of the end covers the outer surface of the valve casing contiguous to the opening of the port 30.

The provision of the closure absolutely protects the valve from all injury which might result from the accumulation of dirt, dust and other foreign matter, in the port 30, which in time might reach the inner valve and cause leaks. This is an important feature of my invention, because these valves are located in places where they are constantly subjected to very severe conditions of dirt and moisture, and it is of essential importance, if the valve is to be provided with a port which opens to the exterior, that positive means should be provided for protecting the valve. Without such means, the provision of means for bleeding the hose connection, which contemplates an opening leading to the interior of the valve is impracticable for use on railroads.

The application of my invention to existing constructions of the type illustrated is extremely simple. The ports above described in the valve casing and spigot valve may be bored while the same are disassembled, or, as a matter of fact, it can be done without disassembling the valve by turning the valve into the position shown in Fig. 3, boring the port 30 through the casing, disconnecting the hose coupling and then boring the port 32 through the side of the valve. After the outer end of the port 30 has been flared, the side of the valve casing is flattened, if necessary, and the closure is then attached thereto by two screws 44, 44, set in suitable threaded holes in the valve casing, and the installation is completed. This enables my invention to be embodied in shut-off valves now in use with very little labor and comparatively little expense for parts.

In the operation of my device, when it is desired to uncouple any two connected cars, the trainman follows out his usual method. He closes the valve 10 in the end of one car and then moves over and closes the valve 10 on the end of the adjacent car. After the first valve has been closed, and during the interval of time between the closing of that valve and the closing of the second valve, the entire line will bleed and it is therefore necessary to close the second valve as quickly as possible after the closing of the first valve. The amount of bleed of the train line, however may be controlled within certain limits by regulating the size of the ports 30 and 32. By making these ports very small the amount of bleeding of the train line between the two closings will not be appreciable yet will be sufficient after the second valve has been closed to reduce the air pressure in the hose connections to permit immediate uncoupling so that no time will be lost by the trainman in completing the usual operations involved in uncoupling.

When the first valve 10 is turned into the position shown in Fig. 3, the air pressure in the train line exerts a pressure upon the boss 42, forcing it to uncover the outer end of the port 30, thereby allowing the air to escape around the boss and this continues after the closing of the second valve 10 until the pressure in the hose coupler has been reduced to atmospheric pressure when the spring tension in the closure will cause the boss 42 to again close the port 30. The only time that the boss 42 is disengaged from its seat is when the air pressure is reduced in the hose connections just previous to the uncoupling operation, and at all times the boss is in tight engagement with its seat.

It is to be observed that my invention is of great simplicity and the shut-off valves now in use on railroad cars may be very quickly and easily modified in accordance therewith and without any great expense. The practical results, however, accomplished by my invention are many. Its use greatly facilitates the uncoupling of cars, thereby saving the time of the trainman and, more important still, entirely obviates the necessity of uncoupling the hose connections by pulling the cars apart and forcibly separating the couplings. This advantage results in a very large saving because it prevents the wearing out and breaking of the hose connections now due to the strain to which they are now subjected when uncoupled by pulling the cars apart, and it also saves wear and tear in the gaskets and thereby increases the efficiency of the couplings.

Although I have shown my invention as embodied in one form of valve it is to be understood that I am not limited to the particular form of valve shown since other forms of shut-off valves may be used to which my invention is applicable.

What I claim is:—

1. A shut-off valve for air-brake pipes on railroad cars comprising a valve casing, a valve mounted in said casing, said valve casing and said valve being each provided with a port, said ports being so arranged that a clear and unobstructed passage is provided for the air to escape from the pipe on one side of said valve when the latter is in a closed position and means affixed to the outside of said valve casing for closing the outer end of said port in said valve casing; said means being flat and substantially flush with the outer surface of said valve casing and rigidly fixed against lateral movement yet resilient to permit the escape of compressed air from said last mentioned port.

2. A shut-off valve for air-brake pipes on railroad cars comprising a valve casing, a valve mounted in said casing, said valve casing and said valve being each provided with a port, said ports being so arranged that a clear and unobstructed passage is provided for the air to escape from the pipe on one side of said valve when the latter is in a closed position and a thin flat plate secured to the outside of said valve casing for closing the outer end of said port in said valve casing; said plate being substantially flush with the outer surface of said valve casing and rigidly fixed against lateral movement, yet resilient to permit the escape of compressed air from said last mentioned port.

3. A shut-off valve for air-brake pipes on railroad cars comprising a valve casing, a valve mounted in said casing, said valve casing and said valve being each provided with a port, said ports being so arranged that a clear and unobstructed passage is provided for the air to escape from the pipe on one side of said valve when the latter is in a closed position, a thin spring plate secured to the outside of said valve casing for closing the outer end of said port in said valve casing; said plate being secured to the outside of said casing at two points to secure rigidity against lateral movement and being substantially flush with the outer surface of said valve casing.

4. A shut-off valve for air-brake pipes on railroad cars comprising a valve casing, a valve mounted in said casing, said valve casing and said valve being each provided with a port, the port in said valve casing having its outer end flared and said ports being so arranged that a clear and unobstructed passage is provided for the air to escape from the pipe on one side of said valve when the latter is in a closed position and a plate secured to the outside of said valve casing and provided with a countersunk boss at its free end for closing the flared outer end of said port in said valve casing; said plate being substantially flush with the outer surface of said valve casing and rigidly fixed against lateral movement yet sufficiently resilient to permit the escape of compressed air from said last mentioned port.

In witness whereof, I hereunto set my hand this second day of July, 1920.

ALBERT L. COLE.